United States Patent [19]

Guyonnet et al.

[11] Patent Number: 5,198,037
[45] Date of Patent: Mar. 30, 1993

[54] METHOD FOR UNCLOGGING A PIPE CARRYING DANGEROUS SUBSTANCES

[75] Inventors: Alain Guyonnet, Montebourg; Eric Lestournel, Martinvast, both of France

[73] Assignee: Cogema-Compagnie Generale Des Matieres Nucleaires, Velizy Villacoublay Cedex, France

[21] Appl. No.: 699,910

[22] Filed: May 14, 1991

[30] Foreign Application Priority Data

May 18, 1990 [FR] France .................. 90 06263

[51] Int. Cl.⁵ .............................................. B08B 9/02
[52] U.S. Cl. ............................ 134/22.11; 134/22.12; 134/24
[58] Field of Search ............... 134/22.1, 22.11, 22.12, 134/22.18, 24, 34

[56] References Cited

U.S. PATENT DOCUMENTS

| | | | |
|---|---|---|---|
| 2,041,209 | 5/1936 | Ridley | 175/4.57 |
| 2,758,917 | 8/1956 | Popp | 134/24 |
| 3,711,993 | 1/1973 | Liesch et al. | 49/68 |
| 4,007,797 | 2/1977 | Jeter | 175/26 |
| 4,225,362 | 9/1980 | Sentell | 134/24 |
| 4,508,577 | 4/1985 | Conn et al. | 134/24 |
| 4,848,380 | 7/1989 | Francis et al. | 134/24 |
| 5,007,968 | 4/1991 | Coffman et al. | 134/24 |

FOREIGN PATENT DOCUMENTS 885626 12/1961 United Kingdom .
1276591 6/1972 United Kingdom .

Primary Examiner—Theodore Morris
Assistant Examiner—Saeed T. Chaudhry
Attorney, Agent, or Firm—Pearne, Gordon, McCoy & Granger

[57] ABSTRACT

So as to unclog a pipe (16) carrying dangerous and accessible substrances after the removal of a movable member (24, 26), this member is replaced by a guiding member (42), a hydraulic shuttle (66) then being introduced into this guiding member, this shuttle being connected to a high pressure hydraulic source (70) through a box (56) equipped with means for washing the shuttle at the time the latter is withdrawn and means for recovering effluent. The shuttle is then conditioned in a winder connected directly on the box (56).

9 Claims, 11 Drawing Sheets

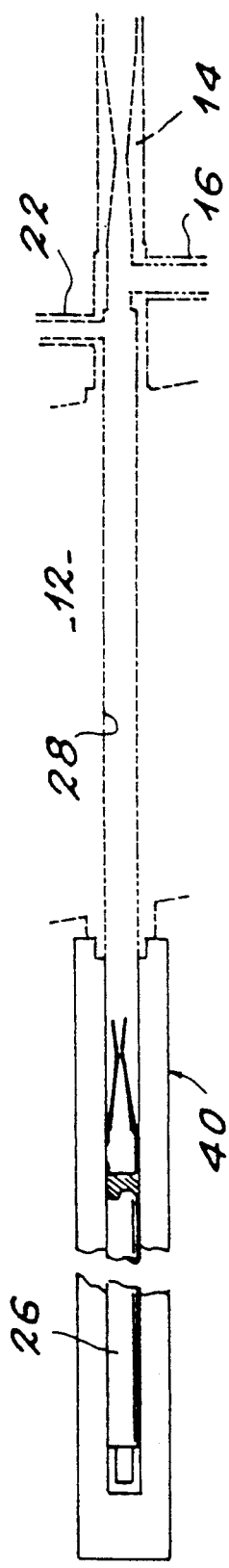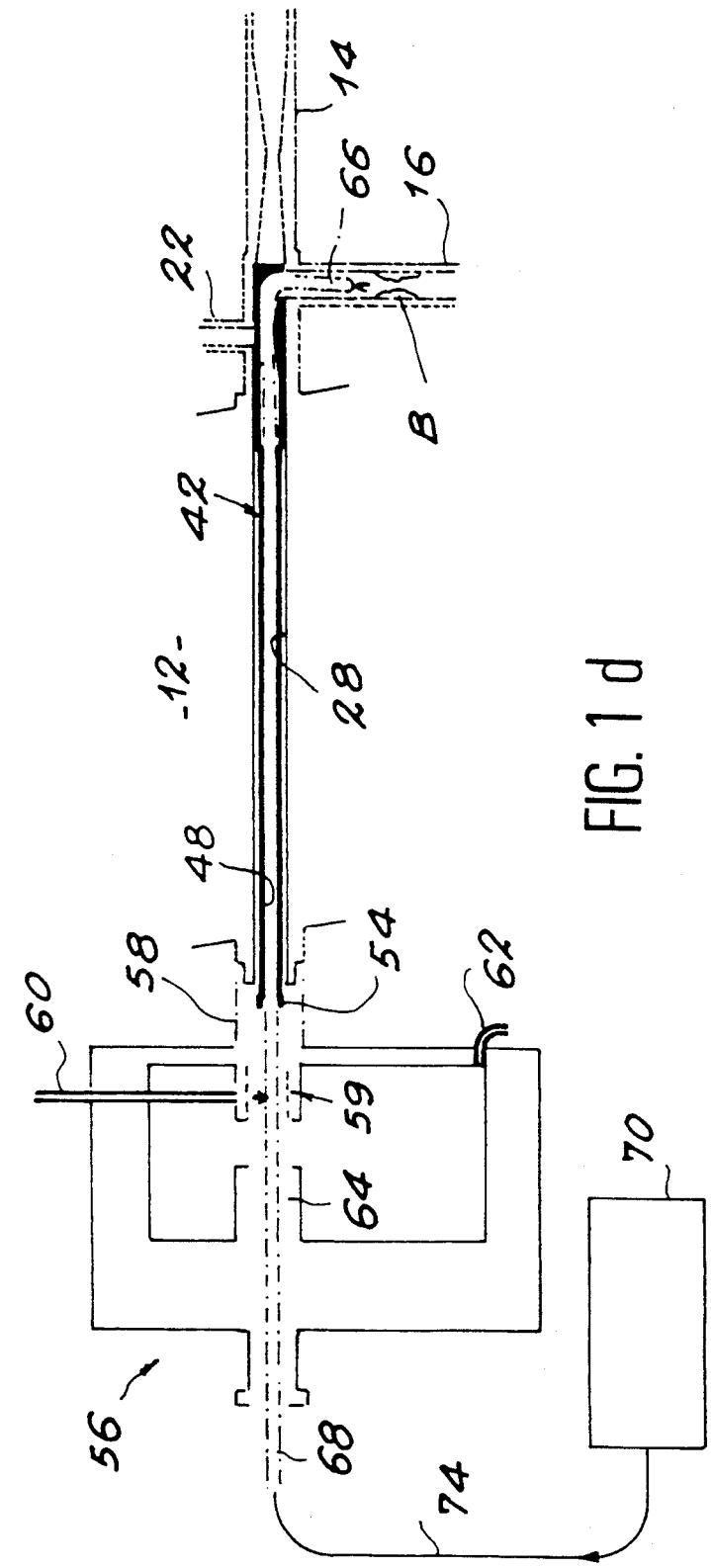

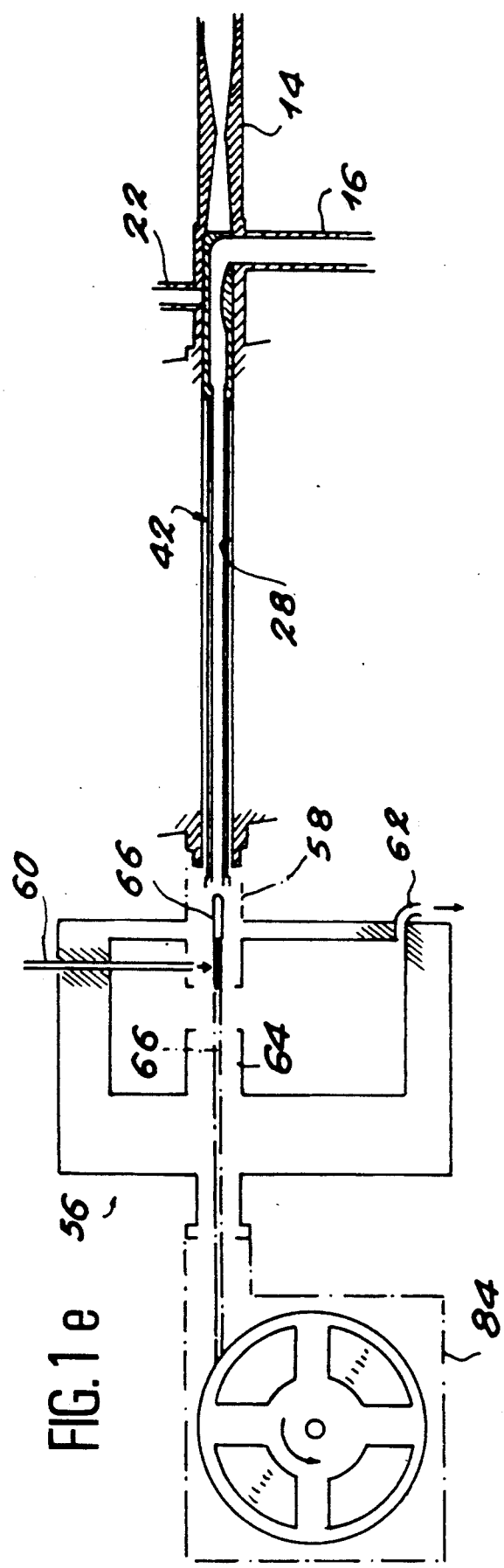
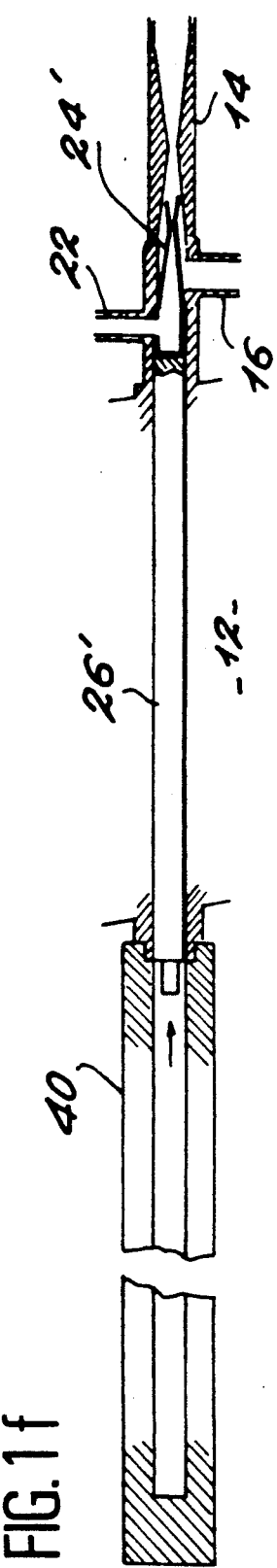
FIG.1e
FIG.1f

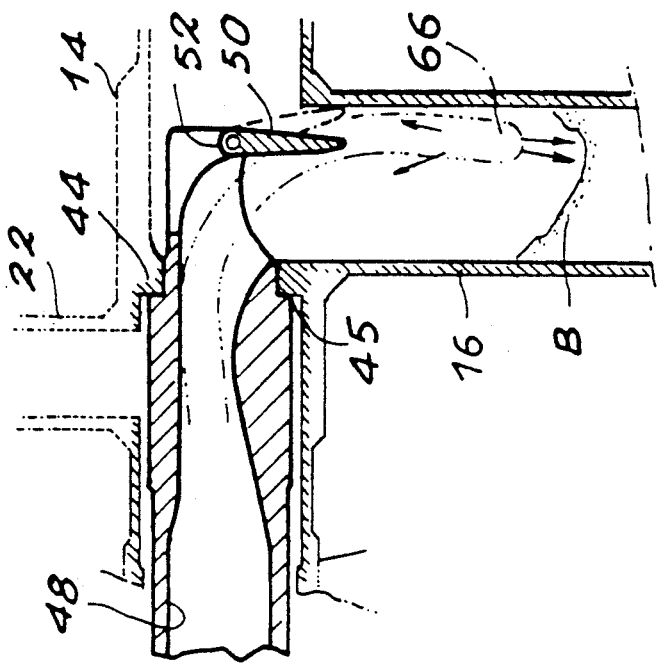
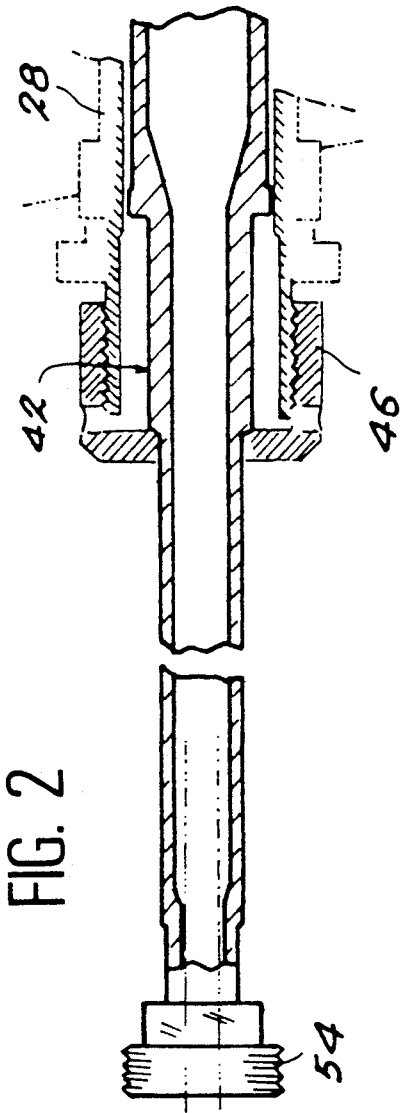
FIG. 2
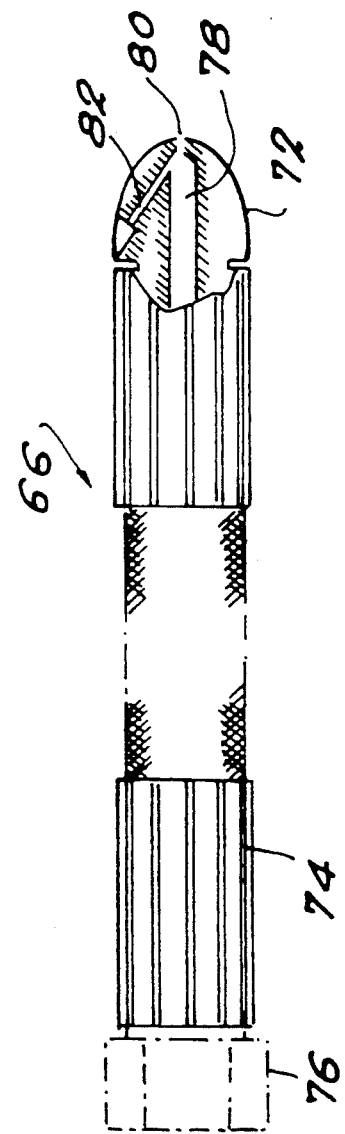
FIG. 3

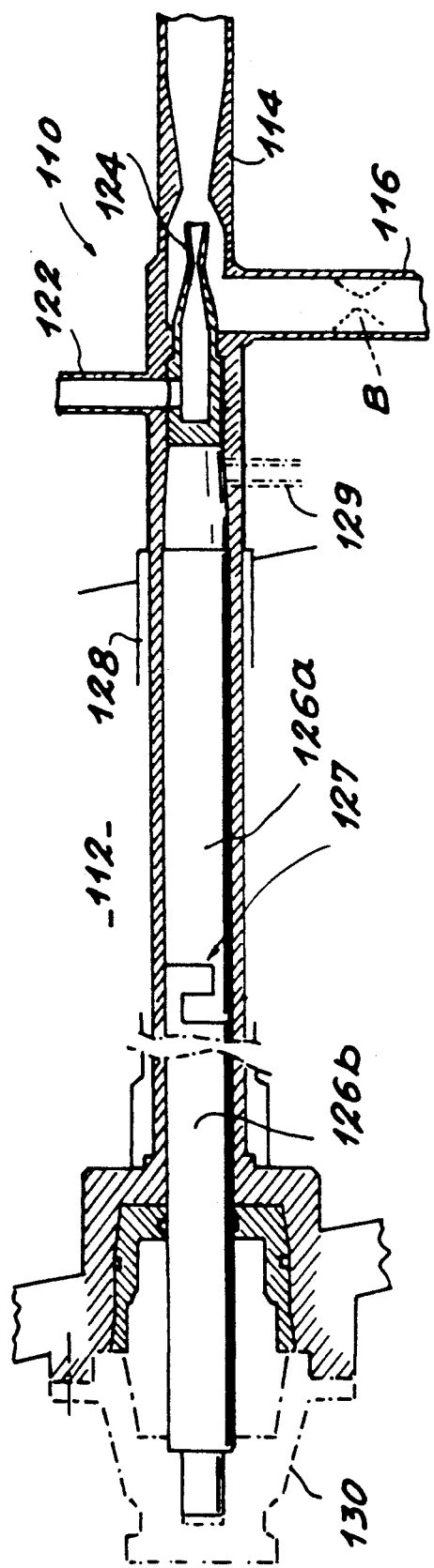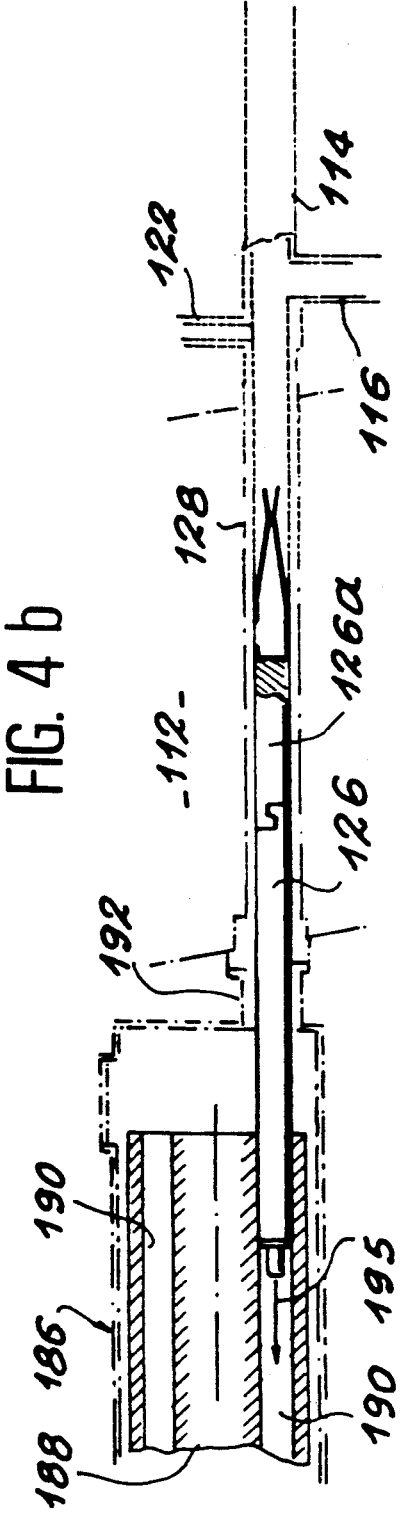

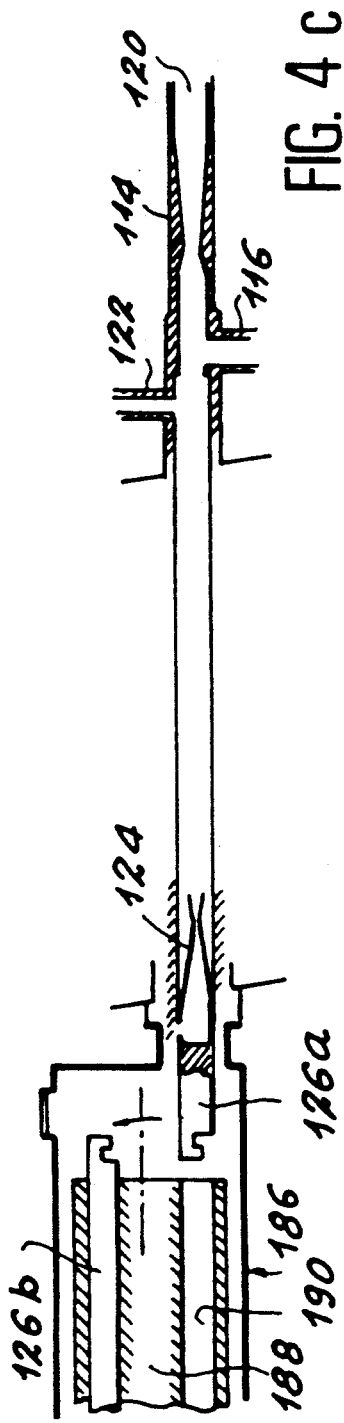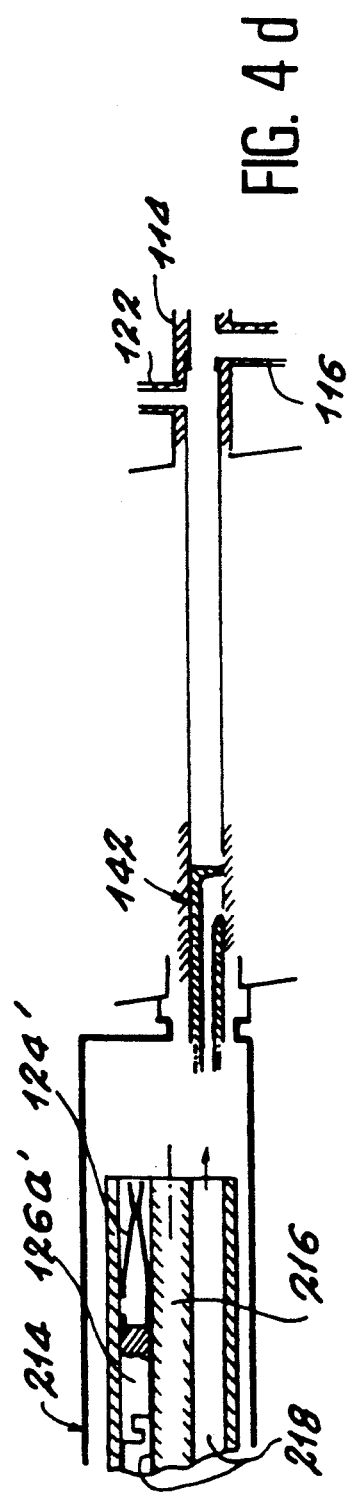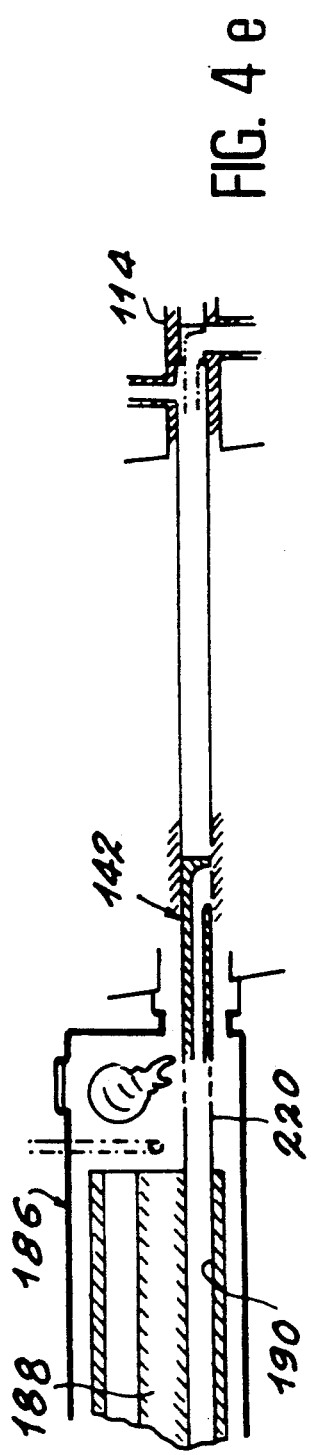

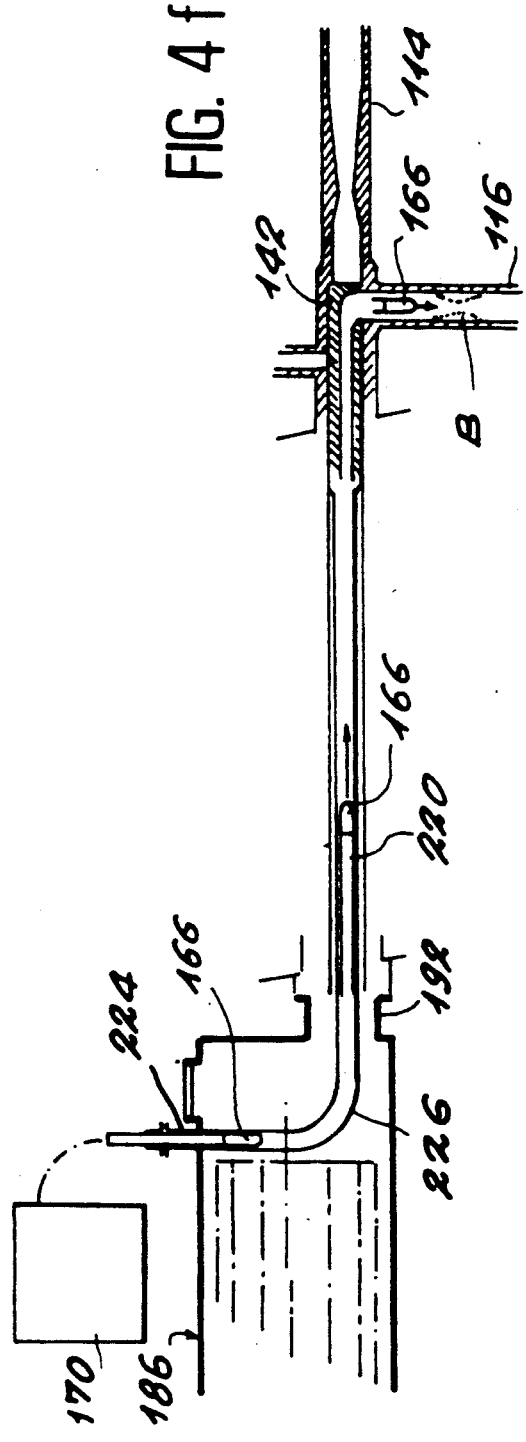
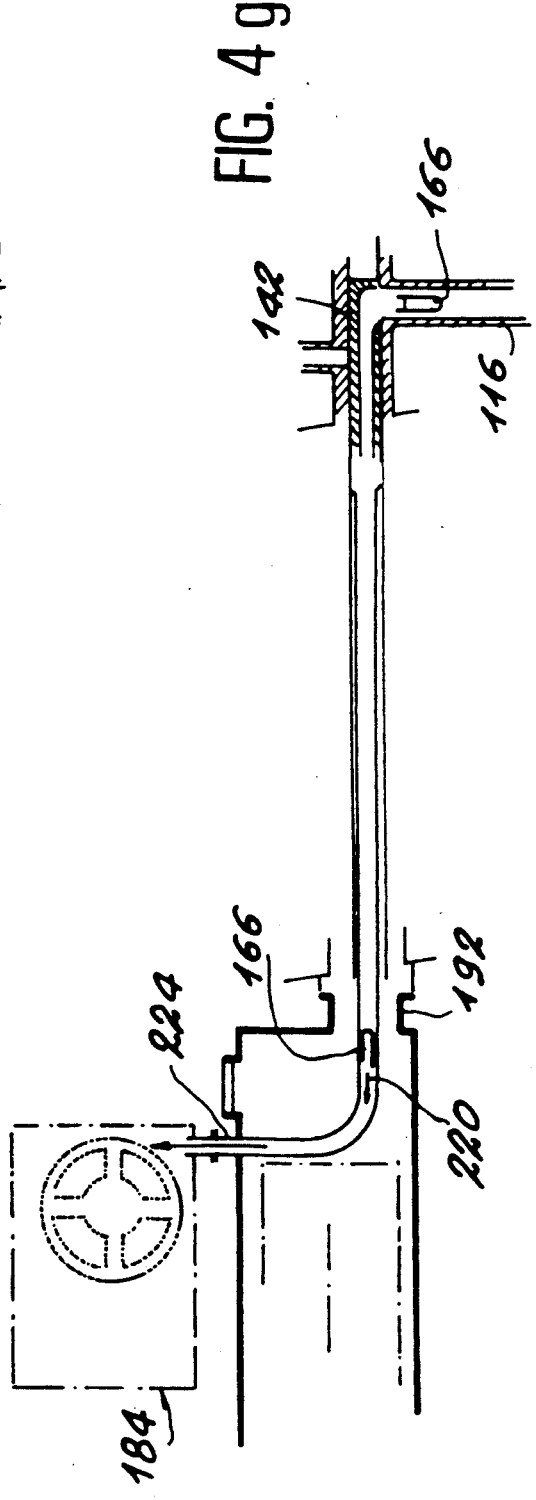

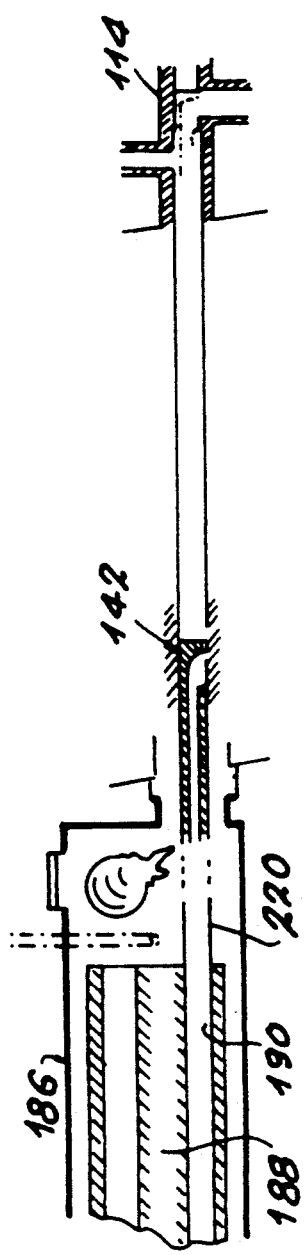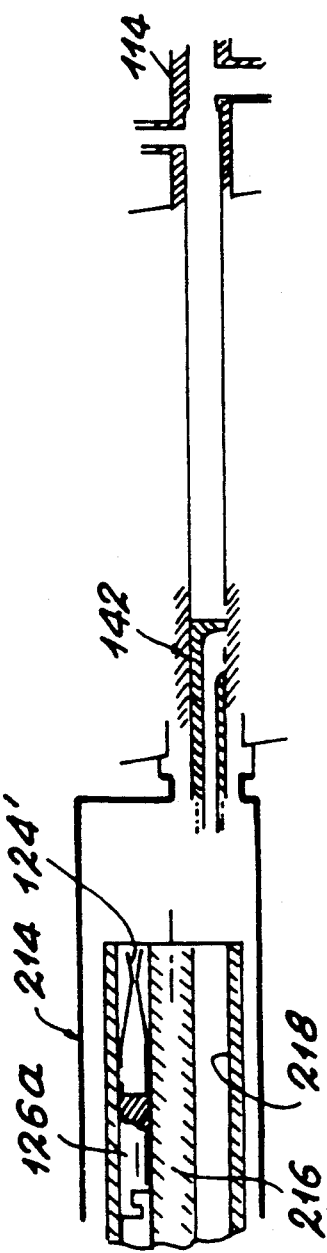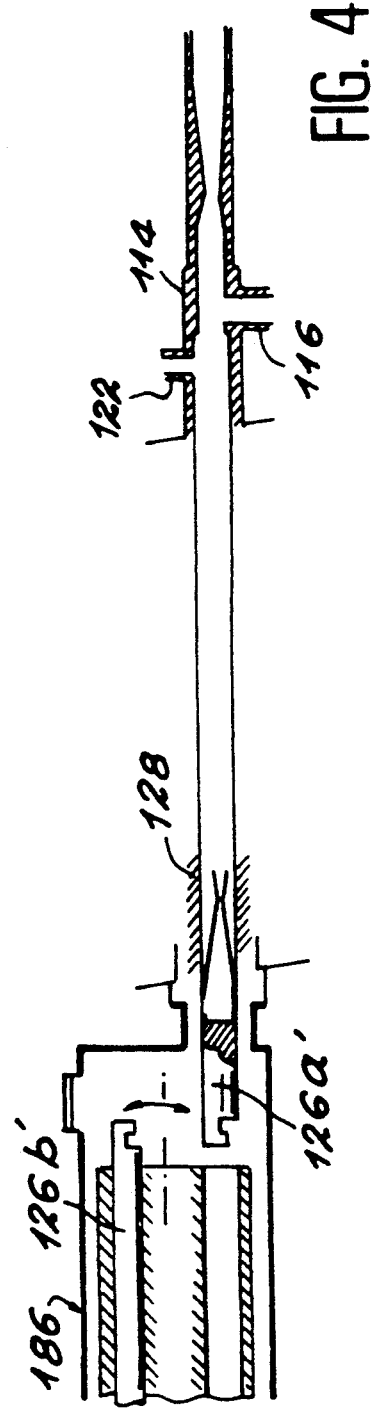

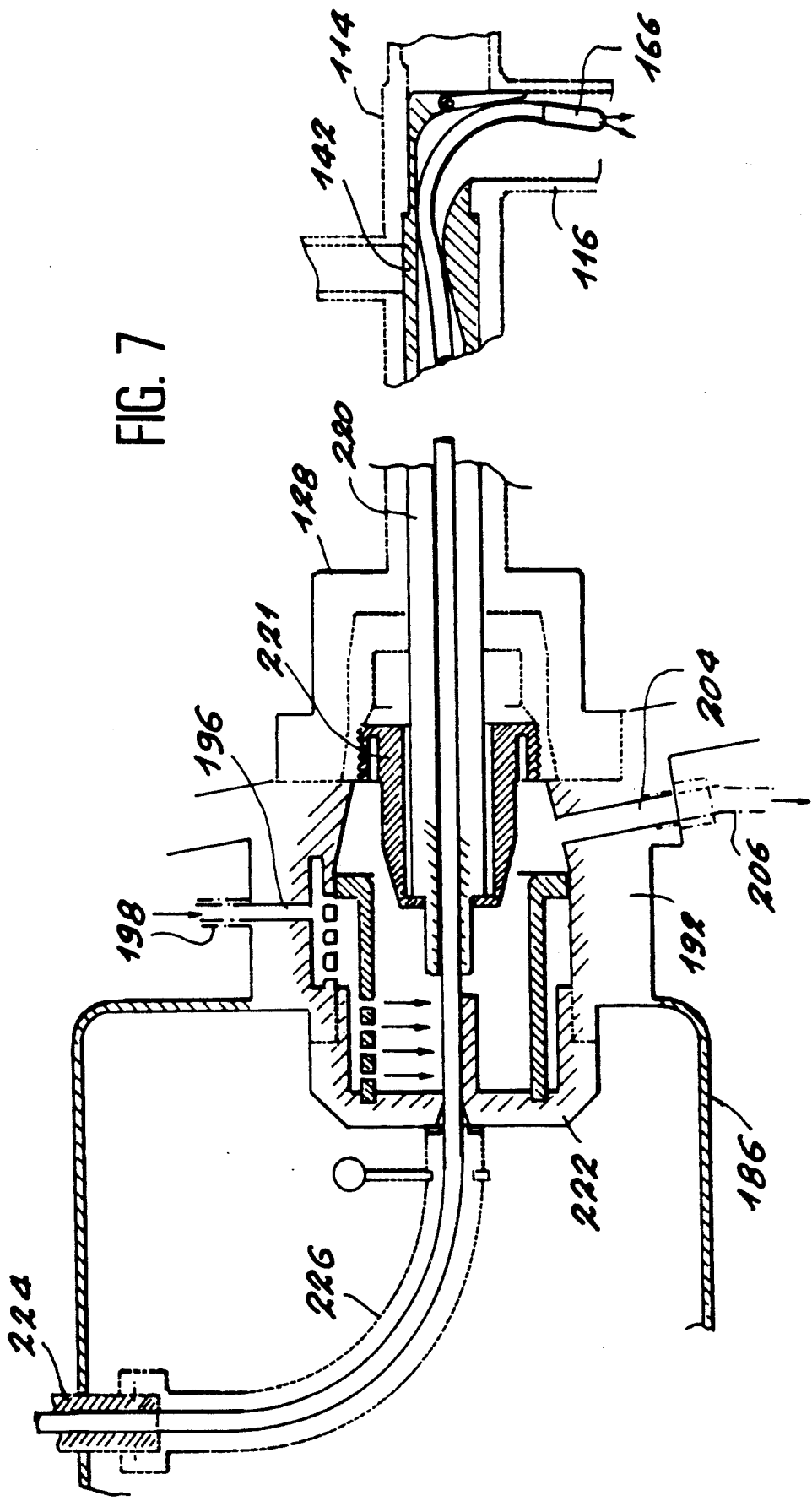

METHOD FOR UNCLOGGING A PIPE CARRYING DANGEROUS SUBSTANCES

FIELD OF THE INVENTION

The invention concerns a method making it possible to unclog from a certain distance a pipe carrying dangerous substances, it being desirable to maintain a confinement at the time of the unclogging operations.

BACKGROUND OF THE INVENTION

In a large number of industrial installations, especially in the nuclear and chemical industries, there currently exist pipes conveying liquids containing sludge and solid particles. The latter create deposits on the walls of the pipes and frequently result in the formation of plugs.

Currently, various solutions are available to unclog blocked up pipes.

One first known solution consists of successively injecting acid into the pipe and then welding it so as to dissolve the plug. This method, which mainly concerns porous or incompletely sealed plugs, has the drawback of being long and does not always provide the desired results.

Another known unclogging method consists of pressurizing the plugged portion of the pipe by connecting the latter directly onto the discharge orifice of a pressure test pump. This technique, simple to implement, does have the drawback of having to pressurize the pipe, this often having the effect of compressing the plug and renders its unclogging by the other existing methods being virtually impossible. Moreover, the pressure rise of the circuit may result in the liquid ascending at the moment of decompression, this possibly having dangerous consequences.

A third technique similar to the latter method consists of sending vapor under controlled pressure into the clogged pipe. This technique has virtually the same drawbacks as the preceding method and consists of using a pressure test pump.

A further known method easy to implement consists of introducing into the clogged up pipe a metallic steel flexible pipe known as a mechanical shuttle. However, this method has the drawback of resulting in the pipe possibly being damaged. In addition, the removal of the flexible pipe is delicate when the operation is carried out in a highly irradiating circuit.

Finally, a final known technique described in the document FR-A-2 611 540 consists of applying a low-frequency excitation to the liquid column contained in the pipe. This method, which has numerous advantages, does, however, have the drawback of pressurizing the circuit and results in a slight excitation of the pipes.

SUMMARY OF THE INVENTION

The object of the invention is to provide a new method for unclogging pipes and making it possible to avoid resorting to pressurizing the latter and is much more effective with less drawbacks inherent in the technique consisting of using a mechanical shuttle.

To this effect, the invention proposes a method for unclogging a pipe carrying dangerous substances, this pipe opening into a tubular body normally sealed off by a movable member, this method being characterized by the fact that it includes the following stages:

depositing of the movable member and placing a guiding member inside the tubular body;

introducing through a sealed box docked on the tubular body and through a passage formed in the guiding member a hydraulic shuttle connected to a hydraulic fluid source under high pressure so as to unclog the pipe via the erosion of the plug blocking up this pipe;

simultaneous recovery of the erosion effluent by a drain circuit opening into said sealed box;

removal of the shuttle into a conditioning winder docked on the sealed box;

simulataneous rinsing of the shuttle when it leaves the guiding member inside the sealed box;

depositing of the guiding member and replacing of the movable member.

According to this method, a shuttle is advantageously used including a nozzle having at least one front orifice used for unclogging of the pipe and rear orifices ensuring the forward movement of the shuttle, the removal of the erosion effluent towards the sealed box and cleaning of the pipe.

Before depositing the movable member, this member is preferably gradually moved back so as to drain the pipe and rinse said member.

In the case of a pipe opening laterally into the tubular body, the guiding member is positioned angularly at the time it is placed and a guiding member is used whose passage comprises an outlet equipped with a hinged guiding tongue deployed automatically in said pipe when the shuttle arrives in contact with said tongue.

BRIEF DESCRIPTION OF THE DRAWINGS

Two embodiments of the unclogging method of the invention shall now be described, given by way of non-restrictive restrictive examples, with reference to the accompanying drawings on which:

FIGS. 1a to 1f are diagrammatic longitudinal sections showing the main stages for implementing the unclogging method of the invention in the case where the movable member allowing for access to the pipe to be unclogged is a pipe bearer rod made of a single piece;

FIG. 2 is a longitudinal cutaway view showing on larger scale a dummy pipe bearer rod whose placing allows the shuttle to be introduced into the pipe after removal of the pipe bearer rod;

FIG. 3 is a partial cutaway view showing the hydraulic shuttle used in accordance with the invention;

FIGS. 4a to 4j are diagrammatic longitudinal sections showing the main stages for implementing the unclogging method of the invention in the case where the movable member allowing for access to the pipe to be unclogged includes a pipe holder unit embodied by two separately dismantable sections;

FIG. 7 is a cutaway view similar to FIG. 6 showing introduction of the shuttle into the pipe to be unclogged and its removal through the barrel type glove box of FIG. 5, and a false pipe holder rod extended by a false extension piece previously placed in the body of the ejector.

DETAILED DESCRIPTION OF THE PREFERRED EMBODIMENTS

Figure 1A:
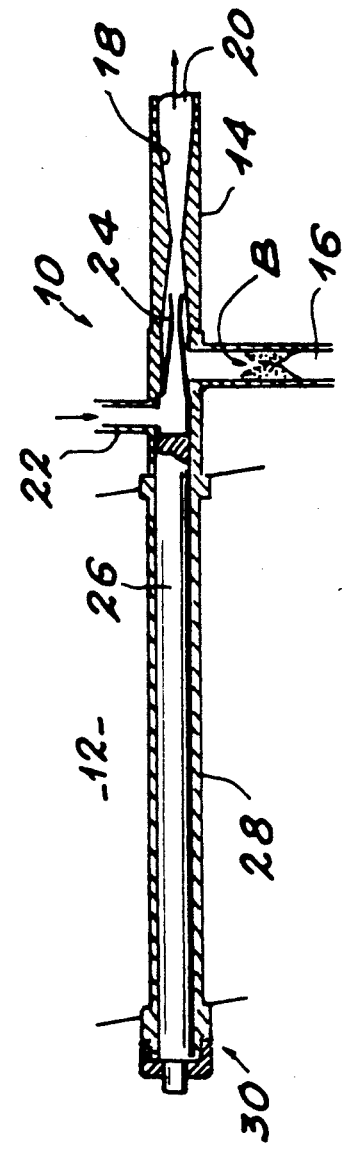

FIG. 1a diagrammatically shows a first type of ejector comprising a movable pipe which when laid makes it possible to gain access to pipes carrying dangerous substances, such as radioactive substances, and in which plugs may possibly form owing to the possible presence of solid particles or sludge in the liquid circulating inside these pipes. This ejector, generally denoted by the reference 10 on FIGURE 1a, may belong to an installation for the reprocessing of nuclear fuels. This installation is confined with respect to the outside by a wall shown partly at 12 on FIG. 1a.

The ejector 10 includes a body 14, generally tube-shaped, secured to the wall 12. Close to the latter, a fluid intake pipe 16 opens at a right angle on the rom this intake pipe 16, the body 14 of the ejector comprises a restriction 18 including one convergent portion and one divergent portion. Beyond this restriction 18, the body 14 opens into the fluid outlet pipe 20.

A third pipe 22 opens laterally onto the body 14 at a location closer to the wall 12 than the intake pipe 16. This pipe 22 is used to direct into the ejector 10 working fluid by means of which the fluid contained in the pipe 16 is sucked into the restriction 18 and then driven back into the outlet pipe 20. To this effect, the pipe 22 opens into a pipe 24 whose outlet is orientated along the axis of the body 14 and is situated sightly upsteam of the portion of the restriction 18 with the smallest diameter.

So as to allow the pipe 24 to be replaced and any possible intervention inside the body 14 of the ejector, the pipe is mounted so as to be able to move inside the latter. So as to allow for this dismounting, the pipe 24 is secured to a cylindrical pipe holder rod 26 which imperviously traverses the wall 12. More specifically, the cylindrical rod 26 is placed in a tubular prolongation 28 of the body 14 of the ejector and which traverses right through the wall 12 and internally is equipped with suitable sealing means (not shown).

The unit formed by the cylindrical rod 26 and the pipe 24 is kept in place against a shoulder formed inside the body by a fixing nut 30 screwed onto the threaded extremity of the tubular projection 28 situated outside the wall 12, this nut 30 abutting against the shoulder formed at the outer extremity of the cylindrical rod 26.

In an installation of this type, the method of the invention, after removal of the unit formed by the cylindrical rod 26 and the pipe 24, makes it possible to unclog any one of the pipes 16 or 20 when a plug is formed in this network of pipes. In the following description, it is assumed that a plug B is formed in the intake pipe 16. The method is identical when the pipe to be unclogged is the pipe 20, the member ensuring guiding of the hydraulic shuttle of the invention merely having a different shape.

In accordance with the invention, unclogging of the pipe in question is effected after having dismounted the rod 26 holding the pipe 24 by replacing this rod with a rod holding a false pipe used to guide a hydraulic shuttle as far as the plug B formed in the pipe. As shall be seen later in detail, the hydraulic shuttle is designed in such as way as to allow it to move forwards into the pipe after having been connected to an under pressure hydraulic fluid source. When unclogging is finished, the removal of the shuttle is ensured by a winder used also for its conditioning so as to take account of the hostile atmosphere existing in the intervention location. The rod bearing the false pipe is then laid down and replaced by a rod bearing a pipe, generally a new one.

Figure 1B:
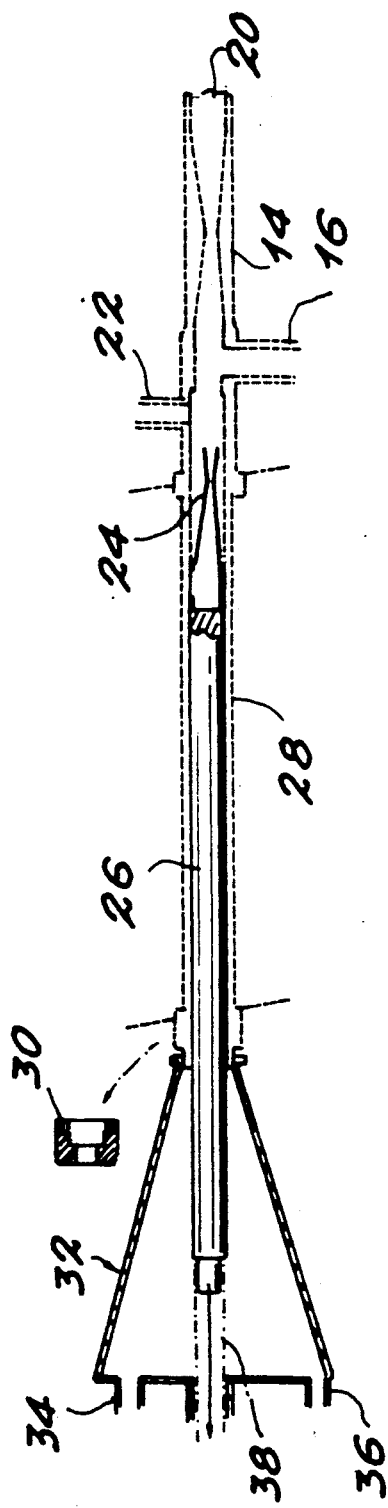

As shown diagrammatically on FIG. 1b, these various operations may be advantageously preceded by a rinsing stage during which the unit formed by the cylindrical rod 26 and the pipe 24 is rinsed with a rinsing liquid, such as water.

So as to carry out this operation, the nut 30 is dismounted, which normally ensures blocking of the cylindrical rod 26 bearing the pipe 24, and a draining box 32 is docked-sealed onto the extremity of the tubular projection 28 of the ejector body 14. This draining box 32 generally has the shape of a funnel, its extremity with the smallest diameter being secured to the tubular projection 28. Its opposing extremity, closed by a disk-shaped partition, is connected at its top part by a tube 34 to a rinsing liquid intake circuit and, at its lower part, by a tube 36 to a draining circuit.

The disk-shaped partition closing the extremity of the draining box 32 has at its center a circular passage whose diameter is equal to the diameter of the cylindrical rod 26 bearing the pipe 24. A cylindrical extension 38 having the same diameter as the cylindrical rod 26 is connected to the extremity of the latter with the aid of a pin (not shown) before placing the drain box 32. This extension piece 28, which sealtraverses the opening formed in the extremity of the drain box 32 opposite the tubular projection 28, makes it possible to carry out a limited backward movement of the cylindrical rod 26 bearing the pipe 24 when a rinsing liquid, such as water, is introduced into the draining box 32 via the tube 34. The aforesaid movable unit is thus progressively washed during its passage inside the draining box 32. The effluent is removed to the drain circuit by the tube 36.

This preliminary operation makes it possible to drain the pipes opening into the body 14 of the ejector.

When this washing and draining operation has been completed, the cylindrical rod 26 bearing the pipe 24 is put back in place with the aid of the extension piece 38, the drain box 32 and the extension piece 38 then being dismantled.

As shown diagrammatically on FIG. 1c, the cylindrical rod 26 bearing the pipe 24 is laid inside a lead sheath 40 docked at the extremity of the tubular projection 28 of the body 14. The backward movement of the cylindrical rod and the pipe inside this sheath is ensured by known means not forming part of the invention.

According to a first main characteristic of the invention, a guiding member constituted by a guiding rod 42 is introduced into the body through its tubular projection. This guiding rod occupies the place previously occupied by the cylindrical rod 26 and the pipe 24. The guiding rod generally has a tubular shape which appears in more detail on FIG. 2. It thus defines an internal guiding passage 48. The axial positioning of the rod 42 is ensured by the abutting of a shoulder 44 against the shoulder 45 formed in the body 14 of the ejector between the pipes 16 and 22 and against which the pipe 24 normally abuts. A nut 46 screwed onto the extremity of the tubular projection 28 of the body 14 enables the guiding rod to be kept in this position.

In the embodiment shown on FIG. 2 and applied to the unclogging of the pipe 16, the guiding passage 48 formed in the false nozzle 42 carries out a draining at 90° opposite the pipe 16. (not shown) enable the operator to ensure that the outlet of the passage 48 is clearly opposite the pipe 16 when the nut 46 is tightened.

The extremity of the passage 48 opposite the pipe 16 is normally blocked off by a hinged tongue 50 joined onto the guiding rod 42 around a spindle 52 perpendicular to the axis of this rod. The tongue 50 is normally kept in its position for blocking off the extremity of the passage 48 by one or several springs (not shown), such as torsional springs mounted on the spindle 52.

The extremity of the guiding rod 42 situated outside is ended by a connector 54, such as a screw connector.

As shown on FIGURE 1d, this connector 54 makes it possible to connect the false nozzle 42 to a washing box 56. More specifically, the connector 54 is connected to a complementary connector (not shown) formed at the extremity of a rectilinear sleeve 58 whose opposing extremity opens into the washing box 56.

To be more specific, the rectilinear sleeve 58 extends inside the washing box 56 where it comprises an annular chamber 59 into which a pipe 60 opens connected to a washing liquid intake circuit. The annular chamber 59 communicates with the passage formed inside the sleeve 58 via orifices through which the washing liquid is able to be injected. A tube 62 connected to the draining circuit opens into the bottom of the washing box 56 so as to direct the effluent in the drain circuit into the bottom of the washing box.

A rectilinear guiding sleeve 64 is situated inside the projection of the rectilinear sleeve 58 so that the extremities of these two sleeves situated inside the washing box 56 are situated close to each other. This guiding sleeve 64 traverses the opposing wall of the washing box 56 and comprises at its extremity situated outside the latter a connector 65, such as a threaded connector.

As shown diagrammatically on FIG. 1d, when the rectilinear sleeve 58 has been connected to the extremity of the guiding rod 42, a hydraulic shuttle 66 is introduced via the external extremity of the guiding sleeve 64. In order to do this, the rear extremity of the hydraulic shuttle 66 is connected to a high pressure hydraulic unit 70.

As shown in more detail on FIG. 3, the hydraulic shuttle 66 includes at its front extremity an ogive-shaped nozzle 72. This nozzle 72 is secured to a reinforced flexible tube 74 ended at its rear extremity by a connection nut 76 by which the hydraulic shuttle 66 is connected to the hydraulic unit 70. The length of the flexible tube 74 is determined according to the distance to be traversed in the pipes by the nozzle 72.

The nozzle 72 comprises an internal passage 78 communicating with the flexible tube 74. This passage 78 opens out at the front extremity of the nozzle 72 and along the axis of the latter via a front orifice 80 and on the periphery of the nozzle 72 via rear orifices 2, possibly three, orientated outwardly and towards the rear. The purpose of the front orifice is to ensure unclogging of the pipe, whereas the purpose of the rear orifices is to ensure the forward movement of the shuttle 66, the cleaning of the pipe in which the latter moves and the removal of effluent towards the washing box.

When the nozzle 72 of the hydraulic shuttle 66 is introduced into the guiding sleeve 64 of the washing box 56, the high pressure hydraulic unit 70 is activated so that the hydraulic fluid is injected under high pressure through the orifices 80 and 82 of the nozzle 72. Having regard to the orientation towards the rear of the orifices 82, the nozzle 72 and the flexible tube 68 connected to this nozzle are automatically introduced into the rectilinear sleeve 58 and then into the guiding rod 42.

When the nozzle 72 arrives in contact with the hinged tongue 50 of the guiding rod, this tongue tilts into the position, shown by the full line on FIG. 2, in which it projects slightly inside the pipe 16. The introduction of the hydraulic shuttle 66 into the latter is rendered easier. The forward movement of the hydraulic shuttle inside the pipe 16 is continued until the shuttle encounters the plug B. The jet of hydraulic fluid leaving via the front orifice 80 then progressively destroys the plug by means of erosion, whereas the effluent is removed towards the washing box 56 by the jets leaving the orifices 82. When they arrive in the washing box 56, this effluent is removed to the drain circuit by the tube 62.

It is to be noted that the jets leaving the rear orifices 82 ensure that the pipe is cleaned when the nozzle moves forward in the latter.

When the pipe 16 has been unclogged, the hydraulic unit 70 is disconnected from the flexible tube 74 and the extremity of the latter is fixed with the aid of a conditioning winder 72 diagrammatically shown on FIG. 1e. By means of this winder 72, the operator gradually removes the shuttle 66. At the same time, washing fluid is introduced by the pipe 60 so as to carry out the progressive washing of the hydraulic shuttle 66 before it is introduced into the winder 72. As previously, the effluent is removed by the pipe 62 to the drain circuit.

When the shuttle is conditioned in the winder 72, the latter is disconnected from the washing box 56 and the latter is also dismantled.

As shown diagrammatically on FIG. 1f, the guiding rod 42 is placed followed by placing a cylindrical rod 26' bearing a new pipe 24'. In order to do this, means are used similar to those described previously with reference to FIG. 1c, that is a lead sheath 40 docked onto the extremity of the tubular projection 28 of the body 14.

With reference to FIGS. 4 to 7, there now follows a description of the unclogging of a pipe belonging, as in the first embodiment described, to an installation for the reprocessing of nuclear fuel, the access to this pipe being made via an ejector whose structure slightly differs from the previous one. So as to better understand this description, the same reference numbers increased by 100 are used to denote members fulfilling similar functions.

As shown on FIG. 4a, the pipe to be unclogged includes in this case an ejector 110 having a body 114, a pipe 124, a fluid intake pipe 116, a pipe 120 for discharging this fluid and a pipe 122 used to feed the pipe 124 with working fluid. The body 114 of the ejector 110 comprises a tubular projection 128 which traverses the wall 112 ensuring confinement of the pipe with respect to the outside environment.

In this second embodiment, the pipe 124 is integral with a cylindrical rod 126a extended by a cylindrical extension piece 126b inside the tubular projection 128. The adjacent extremities of the rod 126a and of the extension piece 126b have complementary hook-shaped cuttings 127 which render these two pieces translation-integral, while allowing them to be made no longer integral via a radial movement of one with respect to the other.

The unit comprising the extension piece 126b, the rod 126a and the pipe 124 is able to be moved and is normally kept in place inside the body 114 of the ejector and its projection 128 by a piece 130 secured by screws to the extremity of the projection 128.

As shown on FIG. 4a, the ejector 110 further comprises in this embodiment a pipe 129 for the removal of leaks, also opening into the body 114, to a location adjacent to the wall 112 and normally blocked off by the rod 126a bearing the pipe 124.

In this embodiment, the main stages used for an operation for unclogging one of the pipes 116 and 120, for example the pipe 116 in the case described here, are identical to those described previously. However, certain stages are rendered more complex by the embodiment of the rod bearing the pipe 124 in two dismantable portions and the equipment used is adapted to this different structure. It is to be noted that this embodiment in two portions of the rod bearing the pipe, needed in this instance by dimensional and environmental requirements, increases the difficulty of retaining confinement during the operation.

Thus, after removal of the piece 130, around the outer extremity of the extension piece 126b, a locking ring 210 is placed (FIG. 6) in which a finger 208 is mounted elastically stressed against the outer surface of the extension piece. As shown diagrammatically on FIG. 4b, a glove box 186 is docked onto the extremity of the tubular projection 128 of the body 114 of the ejector, this glove box fulfilling the functions of the drain box 32 and the washing box 56 of the first embodiment, as well as additional functions.

Figure 5:
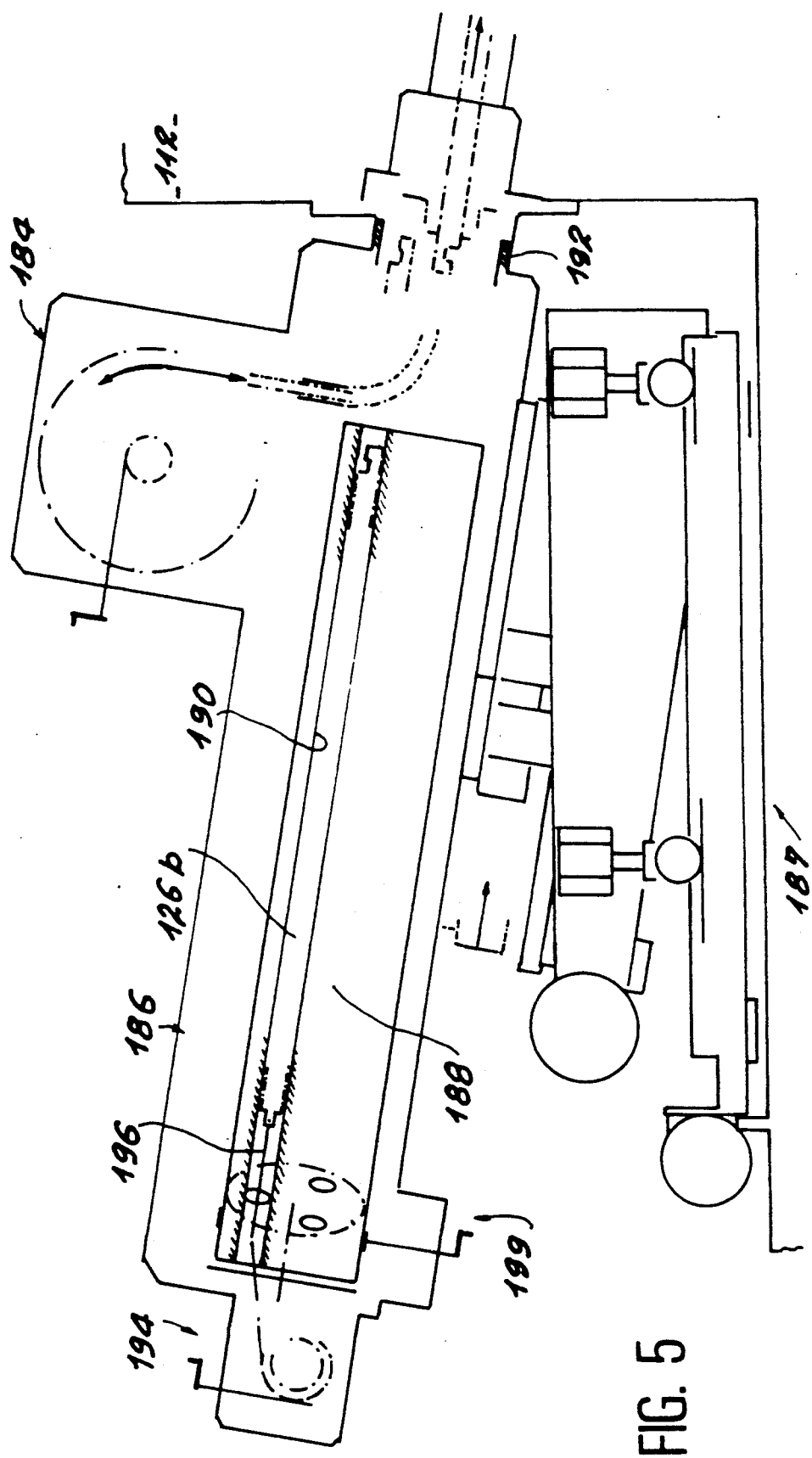
FIG. 5 is a side view representing a partial section of a barrel type glove box used to deposit the extension piece of the pipe holder unit, place a false extension piece, introduce the shuttle and ensure its removal in the second embodiment of the invention shown on FIGS. 4a to 4j.

As shown in more detail on FIG. 5, this glove box 186 is mounted on a carriage 187 ensuring its support, orientation and positioning. This carriage 187, which may be replaced by any other suitable supporting device, does not form part of the invention and shall, not be described in detail.

The glove box 186 is internally equipped with a rotary barrel 188 comprising three tubular cavities 190 able to be brought in turns into the projection of a sheath 192 by which the glove box 186 is seal-connected to the extremity of the tubular projection 128 of the body 114. When an unclogging operation is implemented, one of the tubular cavities 190 is empty, whereas the other two tubular cavities respectively contain a new extension piece 126b' and a guiding rod extension piece of the shuttle, as shall be seen subsequently.

When the glove box 186 is connected to the extremity of the tubular projection 128, the operator makes the barrel 188 rotate with the aid of pivoting control means 189, which may be manual or motorized, so as to bring the empty tubular cavity 190 opposite the sheath 192 (FIG. 4b).

As shown on FIG. 5, the extremity of the glove box 186 opposite the sheath 192 bears a winch 194 by means of which the extension piece 126b is then able to be gradually brought inside the empty, tubular cavity 190 after hooking of the cable 195 of this winch onto the extremity of the extension piece 126b. This hooking is effected manually with the aid of handling gloves (not shown) secured to this effect to the wall of the glove box 186 in the portion situated between the sheath 192 and the barrel 188.

Figure 6:
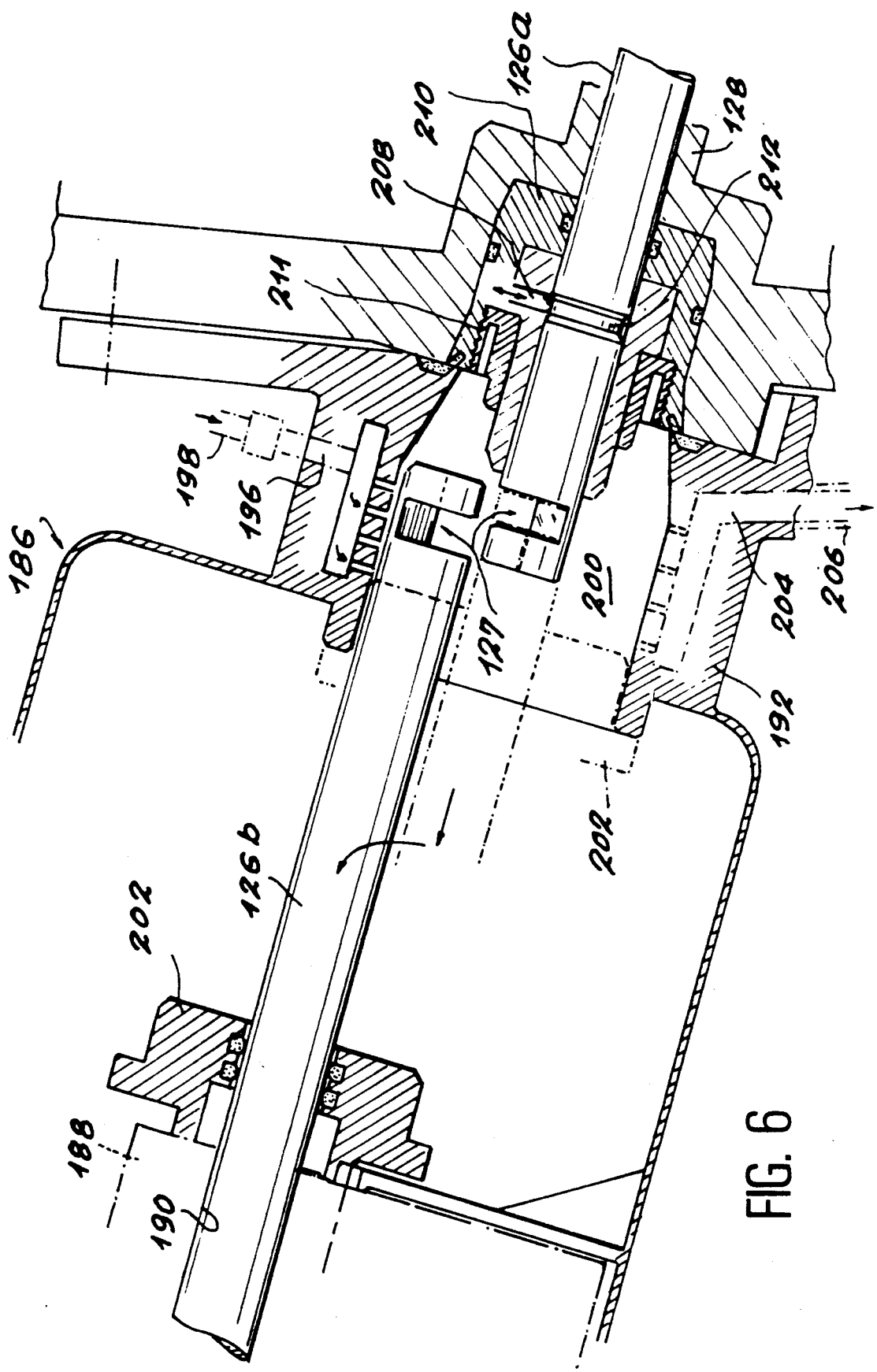
FIG. 6 shows in more detail the stage for disconnection of the extension piece with the pipe holder rod by means of the barrel type glove box shown on FIG. 5.

Furthermore and as shown on FIGS. 6 and 7, the sheath 192 comprises in its upper portion a passage 196 able to be connected via a pipe 198 to a washing liquid intake circuit, this liquid usually being water. The passage 196 opens via several orifices into a chamber 200 delimited inside the sheath 192 and able to be sealed off on the side of the glove box 186 by an impervious plug or stopper 202. This plug is traversed at its center by a passage equipped with annular gaskets able to cooperate imperviously with the outer surface of the extension piece 126b or the cylindrical rod 126a.

In its lower portion, the chamber 200 is connected by a passage 204 traversing the sheath 192 to a pipe 206 connected to a drain circuit.

After connecting the glove box 186 onto the projection 128 of the body of the ejector, the operator secures to the extremity of the extension piece 126b a gripping joining piece (not shown) initially placed in the glove box, the operator then similarly securing the impervious plug to the extremity of the sheath 192 opening into the glove box.

The operator then secures the extremity of the cable 195 to the gripping joining piece and controls the winch 194 so that the extension piece, 126b is gradually pulled into the empty tubular cavity 190. At the time it moves, the extension piece 126b is washed by the washing liquid introduced by the pipe 198 into the chamber 200. At the same time, the leak removal pipe 129 is freed under the effect of the backward movement of the pipe 124 so that the pipes opening into the body 114 are drained. The glove box 186 then carries out the function carried out by the rinsing box 32 in the first embodiment.

This operation is continued until the finger 208 of the locking ring 210 (FIG. 6) penetrates into a throat 212 formed on the cylindrical rod 126a close to the complementary cuttings 127 through which the extension piece 126b is connected.

When this position is reached and as shown on FIG. 6, the extraction of the extension piece 126b is stopped in the same way as introduction of the washing liquid by the pipe 198. The impervious plug 202 is then disconnected from the sheath 192 and brought by sliding onto the extension piece 126b as far as close to the barrel 188 with the aid of handling gloves provided to this effect on the glove box 186.

The operator then controls a rotation of the barrel 188 so as to move the extension piece 126b towards the top, as shown on FIG. 6. Thus, the extremity of the extension piece 126b comes out of the adjacent extremity of the cylindrical rod 126a. When this movement has been completed, the winch 194 is reactivated so as to completely retract the extension piece 126b in the corresponding tubular cavity 190. The sealed plug 202 is then laid on the bottom of the glove box 186.

When this operation shown on FIGS. 4c and 6 has been completed, the glove box 186 is disconnected from the tubular projection 128 of the body 114 of the ejector.

As shown on FIG. 4d, a mobile equipment removal chamber 214 is docked onto the extremity of the tubular projection 128. This chamber 214 is a shielded chamber internally equipped with a rotary barrel 216 provided with three tubular cavities 218. This mobile chamber may be in the document FR-A-83 06028. It is mounted and positioned on a carriage similar to the one bearing the glove box 186.

Before the mobile chamber 214 is docked onto the extremity of the tubular projection 128, two of the tubular cavities 218 respectively receive a cylindrical rod 126a' bearing a new pipe 124', as well as a guiding rod 142. The third tubular cavities, initially empty, is used to receive the cylindrical rod 126a and the pipe 124 initially found in the body 114 of the ejector 110.

So as to allow for its docking onto the extremity of the tubular projection 128 of the body 114, the mobile chamber 214 has one opening opposite which each of the tubular cavities 218 is able to be successively placed. These tubular cavities are further internally equipped with gripping means able to be controlled from outside the chamber.

The barrel 216 is initially placed in a position so that the empty tubular cavity 218 is within the axis of the tubular projection 128 of the body 114. By controlling the gripping means placed in this tubular cavities, the operator grips the extremity of the cylindrical rod 126a so as to retract the latter, as well as the pipe 124 it supports, inside this tubular cavity.

When this operation has been completed, the operator rotates the barrel 216 so as to bring the tubular cavity, in which the guiding rod 142 is placed, opposite the tubular projection 128. Control of the gripping means associated with this tubular cavity allows the guiding rod 142 to be introduced into the tubular projection 128, as shown diagrammatically on FIG. 4d.

The guiding rod 142 in the unit has a structure similar to that of the guiding structure 42 described previously with reference to FIG. 2. Accordingly, it includes an internal passage used for guiding the hydraulic shuttle as far as the pipe to be unclogged when the guiding rod is in position. Close to its extremity orientated outwardly, it further includes an annular throat penetrated by the finger 208 of the locking ring 210 shown on FIG. 6 when the guiding rod is introduced into its ready position, as shown on FIG. 4d.

The mobile chamber 214 is then disconnected from the tubular projection 118 to which the glove box 186 is reconnected, as shown on FIG. 4e. After having rotated the barrel 188 of this glove box so as to align the tubular cavity 190 containing the extension piece 220 of the guiding rod 142 with the sheath 192, the extremity of this extension piece 220 is brought into contact with the adjacent extremity of the guiding rod 142, these two pieces being connected with the aid of gloves secured to the wall of the glove box 186.

The adjacent extremities of the two pieces are equipped to this effect with sealed connection means including, for example, a ring able to slide onto the extremity of the extension piece 220 so as to be screwed onto the extremity of the guiding rod 142. These connection means only allow the extension piece 220 on the guiding rod 142 to be mounted in a single relative angular position.

The extension piece 220, like the guiding rod 142, has an internal passage for guiding the shuttle.

When the extension piece 220 has been connected onto the guiding rod 142, the nut 211 blocking the locking ring 210 (FIG. 6) is unscrewed with the aid of a suitable tool and the ring is removed. The unit formed by the extension piece 220 and the guiding rod 142 is then driven into the body 114 of the ejector until this unit completely takes up the place initially occupied by the pipe 124, the rod 126a and its extension piece 126b.

With the aid of handling gloves secured to the wall of the glove box 186, the operator then angularly orientates this unit, for example with the aid of a tool able to be adapted onto the extremity of the extension piece 220 so as to bring the extremity of the guiding pipe formed in the guiding rod 142 into the projection of the pipe 116 to be unclogged.

Once this operation has been completed, the operator immobilizes the extension piece 220 and the guiding rod 142 by screwing a nut 221 into the extremity of the projection 128 of the body 114. He then places a sealed plug 222 on the extremity of the sheath 192 orientated towards the glove box 186, as shown in detail on FIG. 7. Between a passage formed at the center of this sealed plug 22 and a joining piece 224 traversing the wall of the glove box 186, the operator then connects an arc of a circle shaped guiding tube 226 by using the gloves secured to the glove box.

After a plug blocking off the joining piece 224 outside the glove box 186 has been removed, a shuttle identical to the one described with reference to FIG. 3 is introduced into the tube 224 after the latter has been connected to a high pressure hydraulic unit 170 (FIG. 4f).

Under the effect of the hydraulic fluid leaving via the rear orifices of the nozzle of the shuttle 166, this shuttle slowly moves into the arc of a circle shaped tube 226, into the extension piece 220, the guiding rod 142 and then into the pipe 116. The shuttle 166 carries out inside this pipe the unclogging operation in the same way as in the first described embodiment.

Once this operation has been completed, the hydraulic unit 170 is disconnected from the extremity of the flexible tube of the shuttle and this extremity is connected onto the hub of a conditioning winder 184. In addition, this winder 184 is connected directly onto the joining piece 224 traversing the wall of the glove box 186. In these conditions and as shown on FIG. 4g, the hydraulic shuttle 166 is gradually brought back into the winder 184. During this movement, the shuttle is washed by the washing liquid introduced by the pipe 198 described previously with reference to FIGS. 6 and 7.

Once the shuttle is conditioned inside the winder 184, the latter is disconnected from the glove box 186, the arc of a circle shaped tube 226, the sealed plug 222 and the nut 211 being dismantled. The locking ring 210 is put back in position and the operator is then able to retract the extension piece 220 inside the empty tubular cavity 190 still found in the projection of the sheath 192, as shown on FIG. 4h. As soon as the guiding rod 142 arrives at its blocking position determined by the arrival of the finger 208 in the corresponding throat (FIG. 6), the extension piece 220 is disconnected from the guiding rod 142 and is completely retracted inside the corresponding tubular cavity 190 of the barrel 188.

The glove box 186 is then disconnected from the tubular projection 128 of the body 114 of the ejector and the mobile chamber 214 is redocked onto the extremity of the tubular projection 128. In these conditions and as shown on FIG. 4i, the guiding rod 142 is retracted inside the empty tubular cavity 218 of the barrel 216, a new pipe 124' then borne by a cylindrical rod 126a' being introduced into the extremity of the tubular projection 128 and then into the body 114 so as to place the ejector back in operating conditions.

Once these operations have been completed, the glove box 186 is disconnected from the tubular projection 128 and the piece 130, secured to this projection and ensuring the keeping in place of the pipe of the ejector, is put back into position.

Of course, the invention is not merely restricted to the embodiments described above given by way of examples, but covers all its possible variants. In particular, it is important to note that the operations concerning the dismantling and putting back in place the pipes of the ejector are operations generally known not forming part of the invention. Furthermore, it is also important to mention that the unclogging method of the invention is not merely limited to accessible pipes after removal of a pipe of an ejector, but also allows for access to be gained to a possibly clogged pipe. From this point of view, it is also important to mention that the unclogging method of the invention does not solely concern the nuclear industry, but may also be applied in all instances where pipes carrying dangerous substances may become accidentally clogged, especially pipes in chemical industrial applications.

What is claimed is:

1. Method for unclogging a pipe carrying dangerous substances, this pipe opening into a tubular body normally blocked off by a movable member, this method including the following stages:
   removing said movable member from the tubular body;
   placing a guiding member in the tubular body;
   introducing under pressure into the pipe through a sealed box docked onto the tubular body and through a passage formed in the guiding member an hydraulic shuttle so as to unclog the pipe via the erosion of a plug blocking up the latter;
   simultaneously recovering erosion effluent by a drain circuit opening into said sealed box;
   removing the shuttle in a conditioning winder docked onto the sealed box;
   simultaneous rinsing of the shuttle on leaving the guiding member inside the sealed box.

2. Method according to claim 1, further including the steps of moving the shuttle through the passage formed in the guiding member, removing the erosion effluent towards the sealed box and cleaning of the pipe, said shuttle including a nozzle having at least one front orifice used for unclogging of the pipe and rear orifices ensuring movement of the shuttle, removal of the erosion effluent and cleaning of the pipe.

3. Method according to claim 1, wherein before the movable member is removed, this member is gradually withdrawn from the tubular body so as to drain the pipe and allow rinsing of said member.

4. Method according to claim 3, wherein before withdrawing the movable member from the tubular body, a drain box connected to the drain circuit and a rinsing liquid intake circuit is docked onto the tubular body, said drain box being disconnected prior to removal of the movable member.

5. Method according to claim 3, wherein said sealed box is docked onto the tubular body before withdrawing said movable member from the tubular body and said sealed box is connected to the drain circuit and a rinsing liquid intake circuit.

6. Method according to claim 5, wherein, as the tubular body is normally blocked off by the movable member and an extension piece of said member situated outside with respect to the latter, a sealed box is used containing a barrel with at least three tubular cavities, a guiding extension piece and an exchange extension piece are placed in two of these tubular cavities prior to docking of the sealed box on the tubular body, the extension piece of said movable member being introduced into the third tubular cavity at the time of withdrawal of the movable member from the tubular body.

7. Method according to claim 6, wherein before introducing the hydraulic shuttle into the pipe, the movable member is removed and the guiding member is placed in the tubular body with the aid of a shielded chamber, followed by the connection of an orifice for introducing the hydraulic shuttle into the guiding extension piece with the aid of a guiding tube placed in the sealed box.

8. Method according to claim 1, wherein, so as to unclog a pipe opening laterally into the tubular body, the guiding member is angularly positioned at the time it is placed and a guiding member is used whose passage comprises an outlet equipped with a hinged guiding tongue which is automatically deployed in said pipe when the shuttle arrives in contact with said tongue.

9. Method for unclogging a pipe carrying dangerous substances, this pipe opening into a tubular body normally blocked off by a movable member and an extension piece of said member situated outside with respect to the latter, this method including the following stages:
   docking a sealed box on said tubular body, said sealed box being connected to a drain circuit and a rinsing liquid intake circuit and containing a barrel with at least three tubular cavities, a guiding extension piece and an exchange extension piece are placed in two of these tubular cavities prior to docking of the sealed box on the tubular body;
   gradually withdrawing the movable member from the tubular body so as to allow draining of the pipe and rinsing of the member;
   introducing the extension piece of said movable member into the third tubular cavity;
   removing said movable member from the tubular body;
   placing a guiding member in the tubular body;
   introducing under pressure into the pipe through said sealed box and through a passage formed in the guiding member an hydraulic shuttle so as to unclog the pipe via the erosion of a plug blocking up the latter;
   simultaneously recovering erosion effluent by the drain circuit;
   removing the shuttle in a conditioning winder docked onto the sealed box;
   simultaneous rinsing of the shuttle on leaving the guiding member inside the sealed box.

* * * * *

UNITED STATES PATENT AND TRADEMARK OFFICE
CERTIFICATE OF CORRECTION

PATENT NO. : 5,198,037

DATED : March 30, 1993

INVENTOR(S) : Guyonnet et al.

It is certified that error appears in the above-identified patent and that said Letters Patent is hereby corrected as shown below:

```
Column 2, line 34, delete "restrictive" (second occurrence).

Column 3, line 17, delete "rom" and insert --tubular body
          14.  By being distanced from the wall 12 from--.

Column 4, line 66, before "(not shown)" insert --Markers--.

Column 5, line 52, delete "2" and insert --82--.

Column 7, line 32, delete "," (comma); and
          line 54, delete "," (comma).

Column 8, line 16, delete "," (comma);
          line 18, delete "25";
          line 57, after "be" insert --embodied in
          accordance with the instructions contained--; and
          line 64, delete "cavities" and insert --cavity--.
```

Signed and Sealed this

Eighth Day of February, 1994

Attest:

BRUCE LEHMAN

*Attesting Officer*          Commissioner of Patents and Trademarks